(12) United States Patent
Mintzer

(10) Patent No.: US 7,073,243 B2
(45) Date of Patent: Jul. 11, 2006

(54) METHOD FOR USE A USER SELECTABLE SHAPED STAPLE AND APPARATUS

(76) Inventor: Elizabeth Mintzer, 135 W. 81st St., New York, NY (US) 10024

( * ) Notice: Subject to any disclaimer, the term of this patent is extended or adjusted under 35 U.S.C. 154(b) by 6 days.

(21) Appl. No.: 11/019,564

(22) Filed: Dec. 21, 2004

(65) Prior Publication Data

US 2005/0098602 A1    May 12, 2005

Related U.S. Application Data

(62) Division of application No. 10/286,207, filed on Nov. 2, 2002, now Pat. No. 6,840,422.

(51) Int. Cl.
*B23P 19/02*    (2006.01)
(52) U.S. Cl. .......................... 29/525; 29/428
(58) Field of Classification Search .................. 29/525, 29/428, 465, 464, 432; 227/109, 119, 120, 227/132, 134, 136
See application file for complete search history.

(56) References Cited

U.S. PATENT DOCUMENTS

| | | |
|---|---|---|
| 400,792 A | 4/1889 | Remus |
| 1,554,686 A | 9/1925 | Muth |
| 1,594,851 A | 8/1926 | Polzer |
| 1,820,224 A | 8/1931 | Havener |
| 1,943,661 A | 1/1934 | Ellacott |
| 2,361,501 A | 10/1944 | Salzberg |
| 2,473,253 A | 6/1949 | LaPlace |
| 2,847,674 A | 8/1958 | Wasynczuk |
| 3,313,463 A | 4/1967 | Boucher |
| D231,902 S | 6/1974 | Olsen |
| 3,960,307 A | 6/1976 | Doyel |
| 4,182,474 A | 1/1980 | Sato |
| 4,202,481 A | 5/1980 | Yanagida |
| 4,368,839 A | 1/1983 | Okamura et al. |
| 4,878,608 A | 11/1989 | Mitsuhashi |
| 5,414,991 A | 5/1995 | Kfir et al. |
| 5,497,931 A * | 3/1996 | Nakamura ................... 227/109 |
| 2005/0145667 A1* | 7/2005 | Susson ........................ 227/120 |

FOREIGN PATENT DOCUMENTS

IL    104252    8/1996

* cited by examiner

*Primary Examiner*—John C. Hong
(74) *Attorney, Agent, or Firm*—Fish & Neave IP Group of Ropes & Gray LLP

(57) ABSTRACT

The invention discloses a method for securing items together with a user selectable shaped staples and a stapler for dispensing said the user selectable staples. The stapler has a replaceable guide housing assembly designed for the particular user selectable staple having components including a punch, die and guide conforming substantially to the shape of the head of the staple for driving the user selectable staple into a designated material, such as sheets of paper, selected for said the fastening method. The staples are comprised of a head portion and parallel leg portions with the legs extending substantially perpendicular from the planar head portion and wherein the head portion is of a style depicting a form such as a trademark, company logo, a letter or symbol of any kind.

5 Claims, 9 Drawing Sheets

METHOD FOR USE A USER SELECTABLE SHAPED STAPLE AND APPARATUS

BACKGROUND OF THE INVENTION

Figure 1:
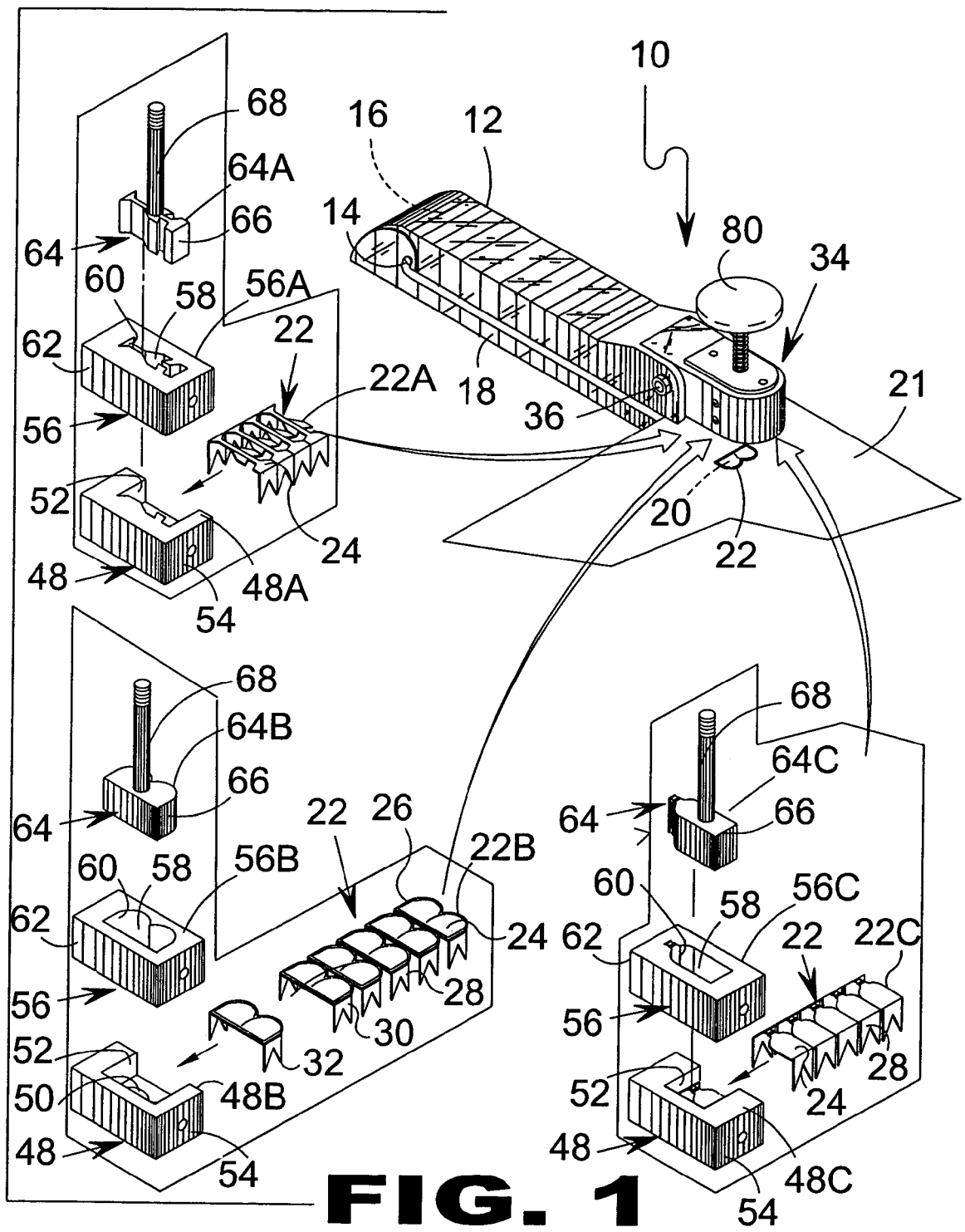

This is a divisional of U.S. patent application Ser. No. 10/286,207, filed Nov. 2, 2002 now U.S. Pat. No. 6,840,422, which is hereby incorporated by reference in its entirety.

FIELD OF THE INVENTION

The present invention relates generally to staplers and, more specifically, to user selectable shaped staples and a stapler for dispensing said user selectable staples. The stapler has a replaceable guide housing assembly designed for the particular user selectable staple having components including a punch, die and guide conforming substantially to the shape of the head of the staple for driving the user selectable staple into a designated material, such as sheets of paper, selected for said fastening method.

The staples are comprised of a head portion and parallel leg portions with the legs extending substantially perpendicular from the planar head portion and wherein the head portion is of a style depicting a form such as a trademark, company logo, a letter or symbol of any kind.

In addition the present invention provides for an additional element in the form of a kit whereby users having the stapler of the present invention can purchase a kit comprised of a different staple design of any color or shape having a plurality of said staples along with the mating punch head, top guide and bottom guide for that particular design of staple. The kits would be available through retail outlets such as K-Mart, Apple, Stop & Shop, Macy's, King Kullen, etc. The kits can also be custom made for companies for any logos that they have.

DESCRIPTION OF THE PRIOR ART

There are other stapler devices designed for specialized staples. Typical of these is U.S. Pat. No. 1,554,686 issued to Muth on Sep. 22, 1925.

Another patent was issued to Havener on Aug. 25, 1931 as U.S. Pat. No. 1,820,224. Yet another U.S. Pat. No. 2,473,253 was issued to Place on Jun. 14, 1949 and still yet another was issued on Jan. 8, 1980 to Sato as U.S. Pat. No. 4,182,474.

Another patent was issued to Yanagida on May 13, 1980 as U.S. Pat. No. 4,202,481. Yet another U.S. Pat. No. 4,878,608 was issued to Mitsuhashi on Nov. 7, 1989.

U.S. Pat. No. 1,554,686

Inventor: John Muth

Issued: Sep. 22, 1925

In a strip staple machine, the combination with means for feeding a staple strip and means for severing and driving the individual staples, of means for engaging a leg of the foremost staple on said strip and holding said staple against turning during the severing operation, said machine having means for positively moving said engaging and holding means into and out of a position so to engage said leg.

U.S. Pat. No. 1,820,224

Inventor: Arthur R. Havener

Issued: Aug. 25, 1931

Disclosed is a holder and carrier for a riveting machine having, in combination, a slide, a pair of oppositely disposed spring arms fast to said slide and spaced apart, and a pair of oppositely disposed plates fast to the lower ends of said arms, the under faces of said plates being provided with grooves, which form a guideway adapted to receive and hold a flat piece of material.

U.S. Pat. No. 2,473,253

Inventor: Desmond R. LaPlace

Issued: Jun. 14, 1949

The invention is an apparatus of the class described comprising a magazine for holding flat staples in face-to-face relation, the staples having a head portion and two leg portions, means for moving staples horizontally one at a time from the magazine, and means for deflecting the legs of the staple vertically by swinging them about an axis that traverses the head, and means for confining the head in a horizontal position during such operation of moving the staples and bending the legs.

U.S. Pat. No. 4,182,474

Inventor: Hisao Sato

Issued: Jan. 8, 1980

A stapler including a staple magazine loaded with conventional staples and a tag magazine detachably connected to the bottom of the staple magazine and loaded with a stick of tags which are detachably connected to each other in a predetermined overlapping relationship in series. When a lever is depressed, a staple driver drives the foremost staple of the staple stick in the staple magazine into the foremost one of the stick of tags in the tag magazine, detaching it from the stick, and further into one or more works so as to attach the tag to the work or works. In addition, various tags adapted for use with the stapler are disclosed.

U.S. Pat. No. 4,202,481

Inventor: Jun Yanagida

Issued: May 13, 1980

A stapling machine adapted for use with a special configuration of a wire staple comprising a base plate having a wire staple receiving mold or recess in one end portion thereof and upright flanged portions at both sides on the opposite ends thereof; a wire staple holding frame in a cylindrical configuration having a cross-sectional shape conforming to the shape of an ornamental wire staple having a broadened center beam section which is wider than the staple points or legs at both sides thereof, and a leaf spring connected at one end thereof with the wire staple holding frame, and the other end being partially bent in a U-shape to provide a repulsive force and partially formed into a hook-shape; a pressure applying member including at one end portion thereof a wire staple extruding member formed in a fork-shape to freely slide into and out of grooves formed in said wire staple holding frame and a pair of upright flanged portions at both sides of the other end thereof forming a bearing for a shaft so as to be pivotally connected with the upright flanged portions provided on the base plate; and a magnet to attract and hold in position the wire staple placed in the staple wire holding frame.

U.S. Pat. No. 4,878,608

Inventor: Yoshio Mitsuhashi

Issued: Nov. 7, 1989

A stapler for use with sheet metal staples each having an ornament joined to a bridge interconnecting a pair of parallel legs. The staples are bonded together to form a staple bar, with the ornaments placed in overlapping relation to one another so that the bridges of the joined staples form an obtuse angle with each pair of staple legs. The stapler has an elongate staple magazine which is shaped to accommodate the ornamented staple bar and which is pivoted at its rear end on a base so that the front end of the staple magazine is movable into and out of engagement with an anvil or matrix on the base. Pivotally coupled to both the base and the staple magazine, a handle has an ejector for driving the successive ornamented staples out of the front end of the staple magazine against the anvil on the base.

While these fastening devices may be suitable for the purposes for which they were designed, they would not be as suitable for the purposes of the present invention, as hereinafter described.

SUMMARY OF THE PRESENT INVENTION

The present invention is a stapler for dispensing user selectable staples. The stapler has a replaceable guide housing assembly designed for a particular user selectable staple having components conforming to the shape of the head of the staple for driving the user selectable staple into a designated material, such as sheets of paper, selected for said fastening method. The staples are comprised of a head portion and parallel leg portions with the legs extending substantially perpendicular from the planar head portion.

The replaceable guide housing assembly is comprised of a housing having a retaining fastener whereby said replaceable guide housing assembly can be releasably attached to the stapler housing. The replaceable guide housing assembly has a vertical throughbore and a longitudinal throughbore. The longitudinal throughbore provides means for delivery of the user selectable staples to the vertical throughbore from a stapler housing magazine. The vertical throughbore has a guide fixedly positioned therein by means of a fastener and receives the next user selectable staple for application from said longitudinal throughbore having a plurality of said user selectable staples positioned within a magazine having a tensioning member. Each of said staples is attached to the next by means well known within the art forming a row of user selectable staples that can be inserted into the stapler magazine.

Positioned above the guide resident user selectable staple is a die fixedly positioned within said vertical throughbore by means of a fastener. The die also has a throughbore conforming to the shape of the head of the user selectable staple and has a punch traveling therein conforming in shape to the die throughbore and head of the user selectable staple shape.

The punch is connected to a pressure applying handle by means of a punch rod extending through a plate having a tensioning member positioned between said plate and the drive handle for keeping the drive handle and punch head in the retracted position. The drive handle performs the function of driving the punch through the die engaging the user selectable staple head driving said stapler through the guide with the staple legs engaging and passing through the material to be fastened until said staple legs engage the staple legs diverter causing the legs to close under the staple head binding the fastened material therebetween.

A primary object of the present invention is to provide novel means for selectively binding sheets of material using a decorative means.

Another object of the present invention is to provide said decorative means having a predetermined shaped image that may further employ color, print, photoprint, graphic image, engraving or drawing thereupon.

Yet another object of the present invention is to provide said decorative means with a binding means.

Still yet another object of the present invention is to provide said decorative means with a first binding element.

A further object of the present invention is to provide said decorative means with a top surface forming said first binding means whereupon said color, print, photoprint, graphic image, engraving or drawing is displayed thereon.

A yet further object of the present invention is to provide said decorative means having a top surface with lancing means for penetrating a material selected for application of said novel means.

A still yet further object of the present invention is to provide said decorative means having a top surface with a second binding means incorporating said lancing means.

An additional object of the present invention is to provide said decorative means having a first binding element with a second binding element.

Another object of the present invention is to provide said decorative means with said second binding elements that lance the bound material.

Yet another object of the present invention is to provide said second binding element with a lancing means.

Still yet another object of the present invention is to provide said decorative means having a top surface having second binding elements positioned on each end.

A further object of the present invention to provide said decorative means having a top surface with opposing legs positioned on the distal ends.

A yet further object of the present invention is to provide said opposing legs extending substantially perpendicular to said top surface.

A still yet further object of the present invention is to provide said opposing perpendicular-like legs having distal ends terminating in prongs.

An additional object of the present invention is to provide said decorative means having a top surface with said opposing legs forming said second binding means.

Another object of the present invention is to provide said opposing legs terminating in prongs performing said lancing means.

Yet another object of the present invention is to provide a diverting means for said second binding element having lancing means.

Still yet another object of the present invention is to provide a driving means for said decorative means.

A further object of the present invention is to incorporate said decorative means into a user selectable shaped staple.

A yet further object of the present invention is to provide a method for using said decorative means of said novel means whereby after selecting the material or materials for application of said novel means said driving means engages said decorative means having a first binding means and a second binding means with a lancing means wherein said lancing means lances the material before engaging said diverting means which diverts the second binding means coparallel with said first binding means thereby clamping the material between said first and second binding means.

Another primary object of the present invention is to provide an apparatus for the use of said decorative means.

Yet another object of the present invention is to provide a stapler having a removable guide housing.

Still yet another object of the present invention is to provide a stapler having a user selectable staple and a removable guide housing for driving said staple into a material selected for fastening.

A further object of the present invention is to provide a guide housing having a first throughbore providing means for delivering a plurality of staples to the drive mechanism and a second throughbore providing means for housing the drive mechanism.

A yet further object of the present invention is to provide a guide housing having a bottom guide for receiving staples prior to application with said bottom guide having a throughbore conforming in shape to the stapler head.

A still yet further object of the present invention is to provide a bottom guide removably fastened to the guide housing by means of a fastener.

An additional object of the present invention is to provide a bottom guide housing fixedly positioned with the second or vertical throughbore forming an element of the guide housing.

Another object of the present invention is to provide a top guide removably fastened to the guide housing by means of a fastener.

Yet another object of the present invention is to provide a top guide fixedly positioned within the second/vertical throughbore forming another element of the guide housing.

Still yet another object of the present invention is to provide a top guide having a throughbore conforming substantially to the shape of the staple head.

A further object of the present invention is to provide a punch head positioned within the second/vertical throughbore forming another element of the guide housing.

A yet further object of the present invention is to provide a punch head having a shape conforming to the shape of the stapler head.

A still yet further object of the present invention is to provide a punch head that travels through the top guide when pressure is applied to the operative handle.

A still yet further object of the present invention is to provide a punch head that engages the staple head and causes said staple to travel through the bottom guide engaging the material to be stapled, passing through said material before having the staple legs deformed into a closed position by the stapler leg diverter element.

An additional object of the present invention is to provide a punch head operatively connected to the pressure applying handle by means of a punch rod.

Another object of the present invention is to provide means for returning the pressure applying handle and attached punch head to the retracted position after a force has been applied thereto.

Yet another object of the present invention is to provide means for purchasing additional user selectable staples of varying designs.

Still yet another object of the present invention is to provide an interchangeable stapler kit having a user selectable staple, punch head, top guide and bottom guide that can be purchased separately.

A further object of the present invention is to provide a custom stapling system comprising a unique stapler, interchangeable staple kit, and user selectable decorative staples for personal or industry use, available in any color, metal shape, logo or graphic image.

Additional objects of the present invention will appear as the description proceeds.

The present invention overcomes the shortcomings of the prior art by providing a stapler for dispensing user selectable staples. The stapler has a replaceable guide housing assembly designed for a particular user selectable staple having components conforming to the shape of the head of the staple for driving the user selectable staple into a designated material, such as sheets of paper, selected for said fastening method. The staples are comprised of a head portion and parallel leg portions with the legs extending substantially perpendicular from the planar head portion and wherein the head portion is of a style depicting a form such as a trademark, company logo, a letter or symbol of any kind.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

LIST OF REFERENCE NUMERALS UTILIZED
IN THE DRAWINGS 10 stapling apparatus
12 stapler housing
14 stapler housing pivot point
15 stapler housing fastener aperture
16 staple magazine
18 stapler housing base
20 stapler housing diverter
21 material
22 user selectable staple
22A user selectable shaped staple
22B user selectable shaped staple
22C user selectable shaped staple
22D user selectable shaped staple
22E user selectable shaped staple having indicia
24 user selectable staple top surface
26 user selectable staple image
28 user selectable staple legs
30 user selectable staple lancing element
32 user selectable staple prongs
34 guide housing assembly
35 guide housing
36 stapler guide housing retaining fastener 37 guide housing fastener throughbore
38 guide housing guide fastener
40 guide housing die fastener
42 guide housing vertical throughbore
44 guide housing longitudinal throughbore
46 guide housing drive threaded bore
48 guide housing guide
48A guide housing shaped guide
48B guide housing shaped guide
48C guide housing shaped guide
50 guide housing guide throughbore
52 guide housing guide interior wall
54 guide housing guide exterior wall
56 guide housing die
56A guide housing shaped die
56B guide housing shaped die
56C guide housing shaped die
58 guide housing die throughbore
60 guide housing die interior wall
62 guide housing die exterior wall
64 guide housing punch
64A guide housing selectable shaped punch
64B guide housing selectable shaped punch
64C guide housing selectable shaped punch
66 guide housing punch exterior surface
68 guide housing punch rod
70 guide housing punch rod fastener
72 guide housing punch rod drive fastener
74 guide housing drive plate fastener
76 guide housing drive plate
78 guide housing drive return spring
80 guide housing drive handle

BRIEF DESCRIPTION OF THE DRAWING FIGURES

Figure 2:
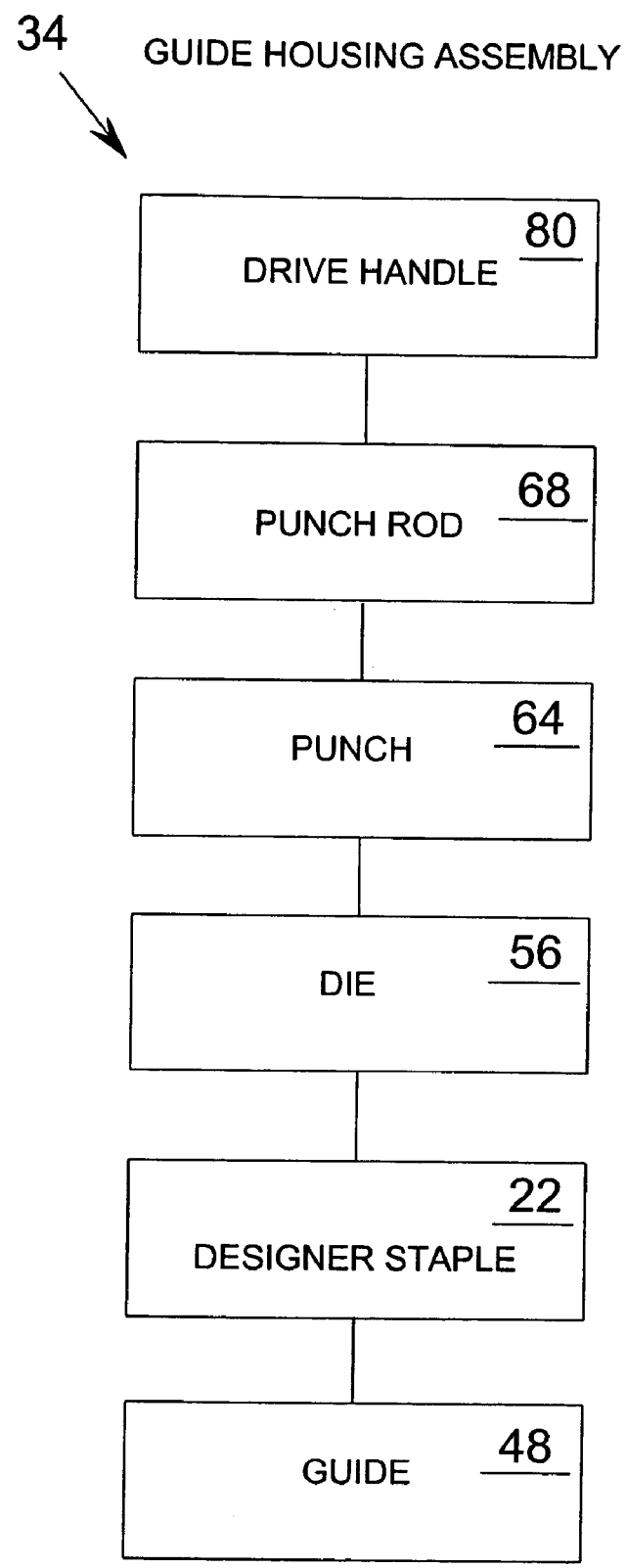
Figure 3:
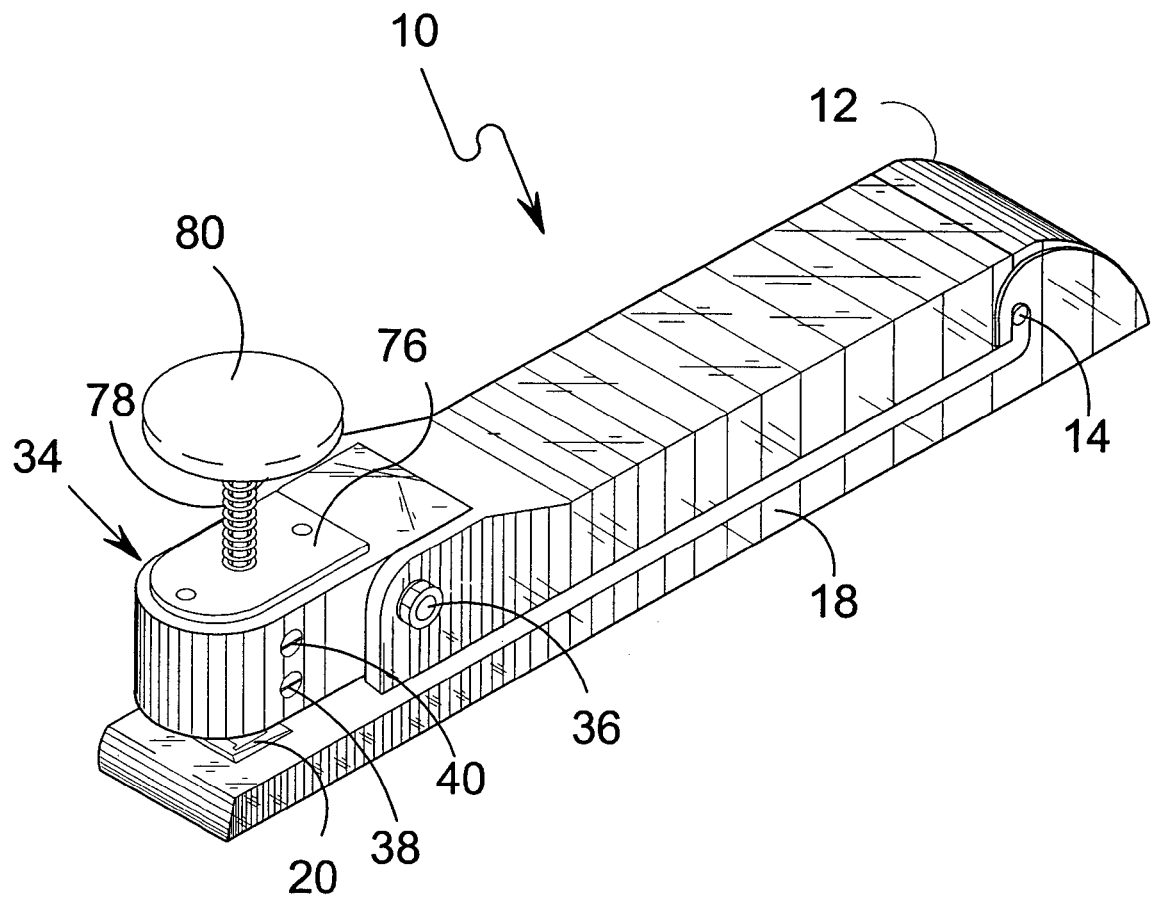
Figure 4:
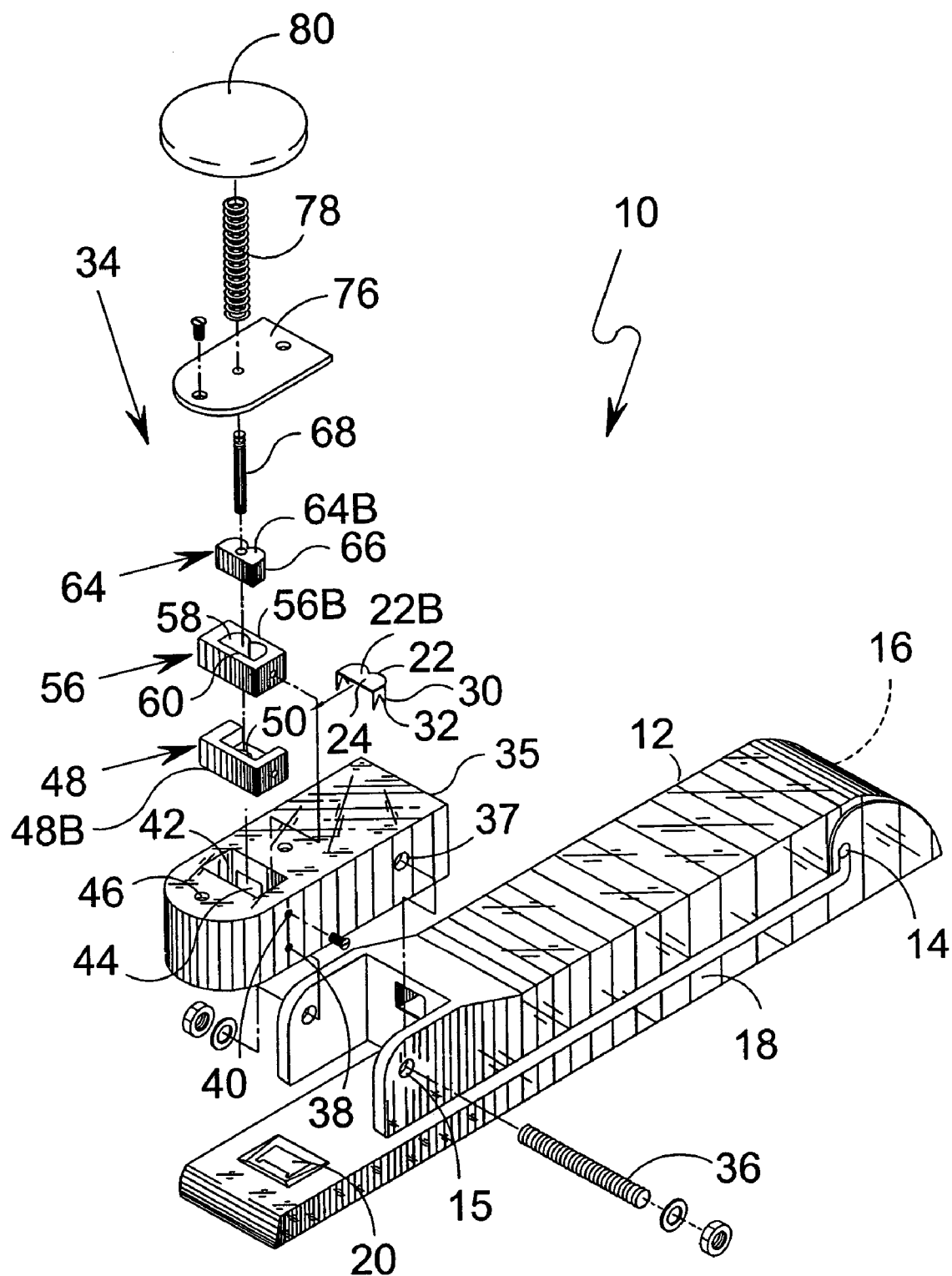
Figure 5:
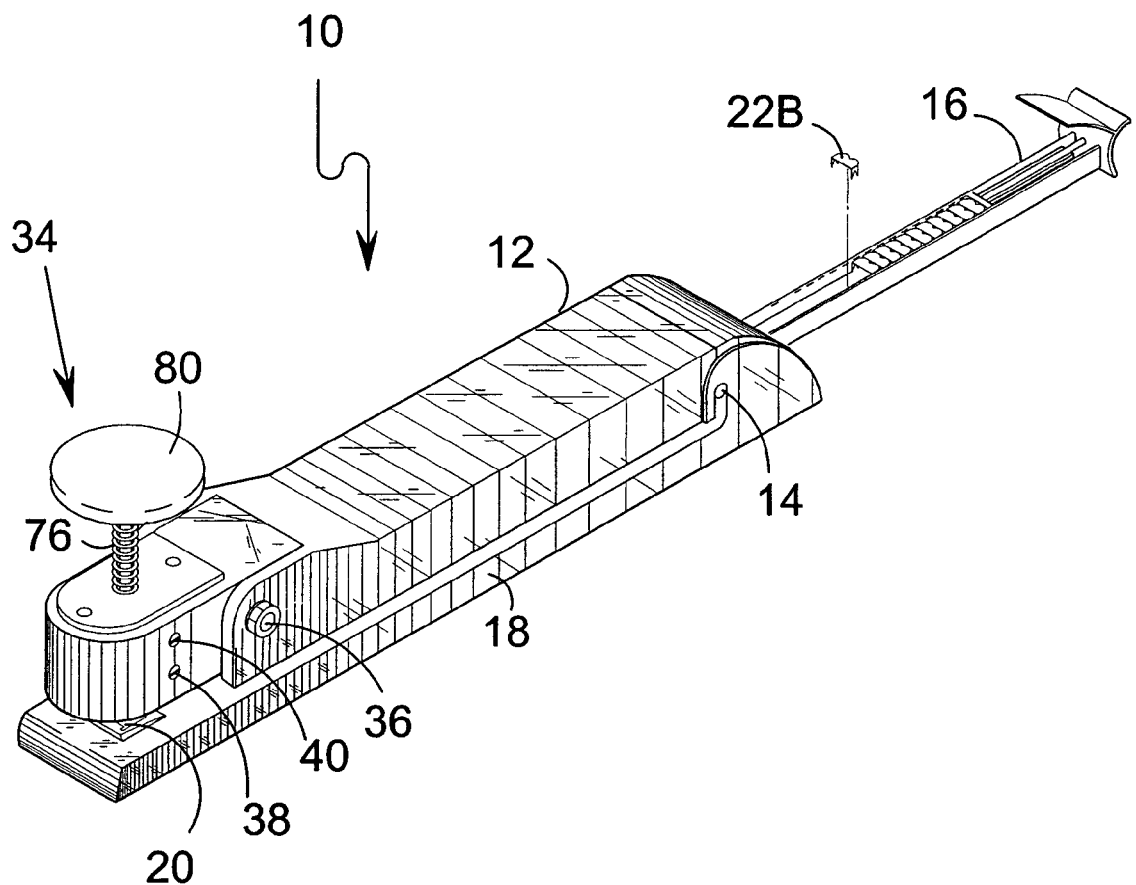
Figure 6:
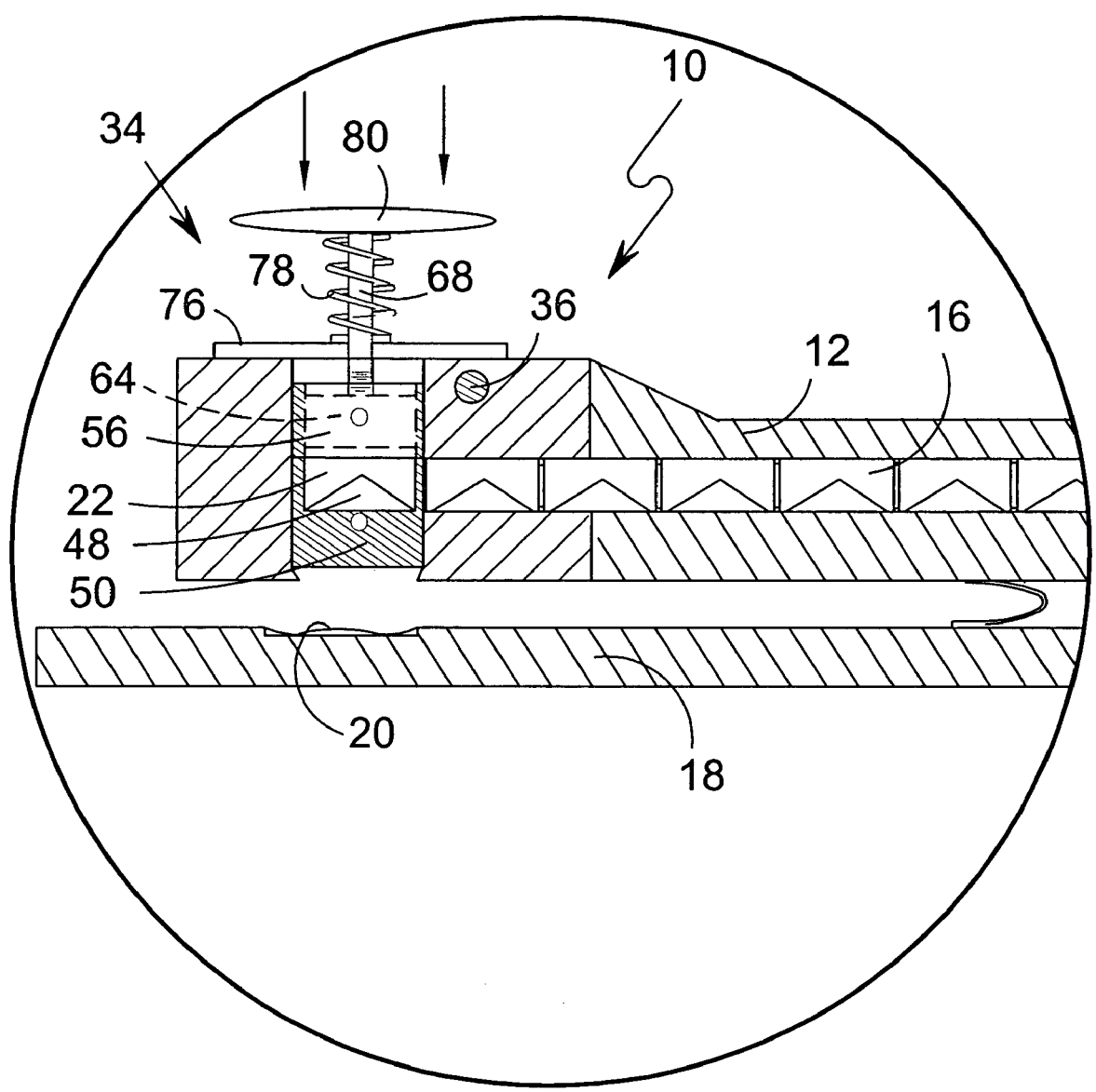
Figure 7:
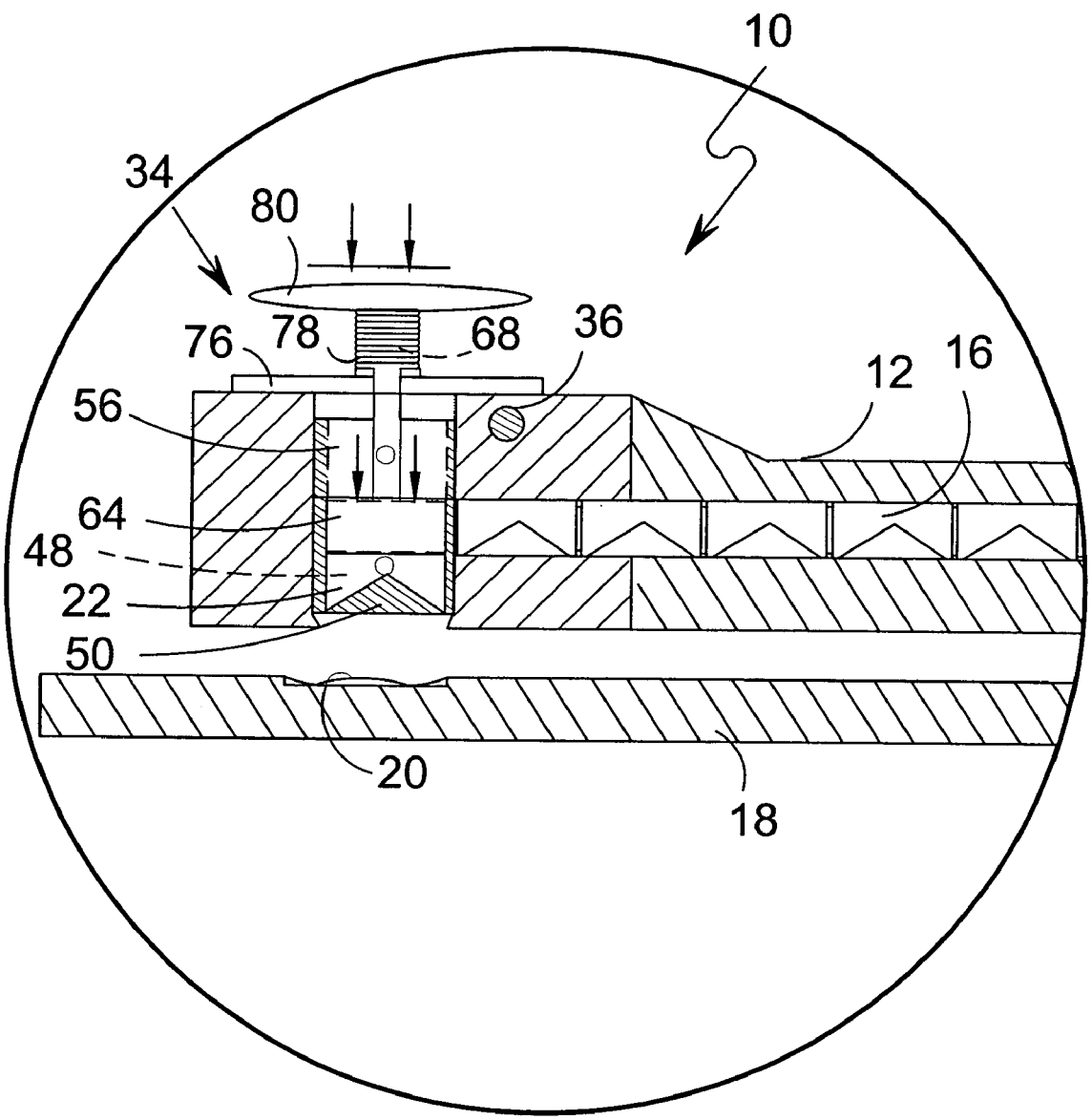
Figure 8:
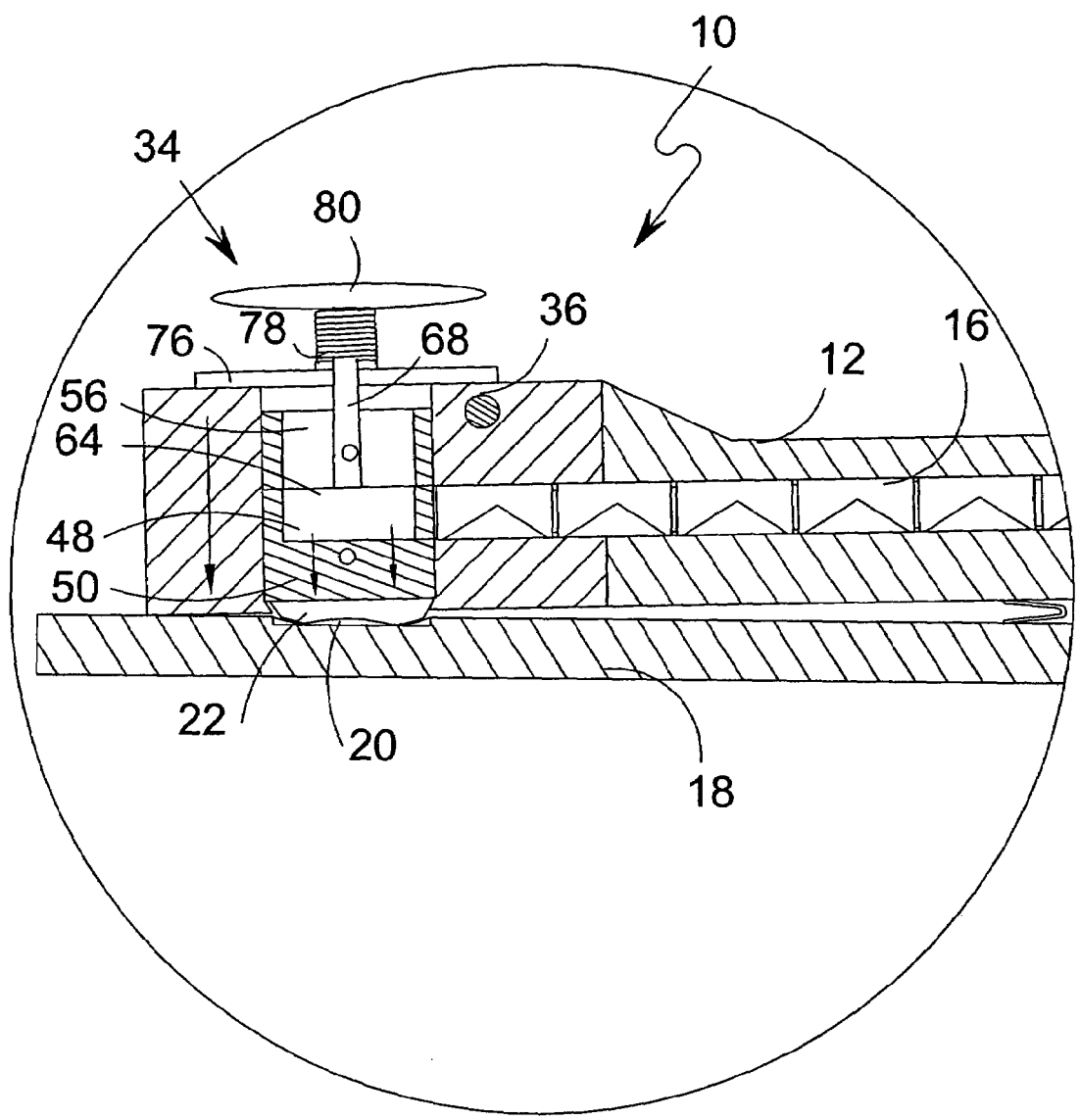
Figure 9:
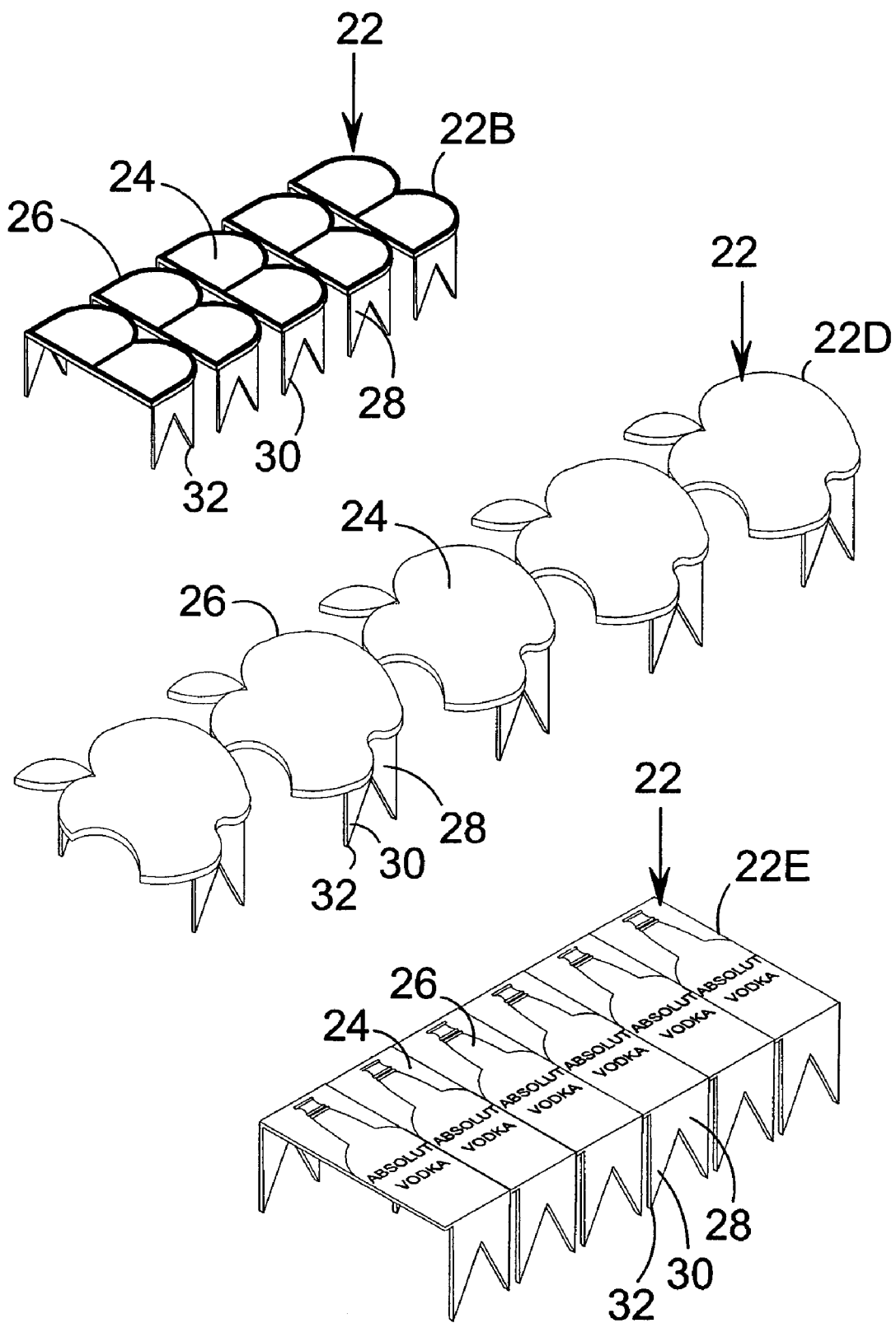

In order that the invention may be more fully understood, it will now be described, by way of example, with reference to the accompanying drawing in which:

FIG. 1 is an illustrative view of the present invention in use.
FIG. 2 is a block diagram of the present invention.
FIG. 3 is a perspective view of the present invention.
FIG. 4 is an exploded view of the present invention.
FIG. 5 is a perspective view of the present invention.
FIG. 6 is a partial sectional view of the present invention.
FIG. 7 is a partial sectional view of the present invention.
FIG. 8 is a partial sectional view of the present invention.
FIG. 9 is a perspective view of the selectable shaped staple.

DETAILED DESCRIPTION OF THE PREFERRED EMBODIMENT

The following discussion describes in detail one embodiment of the invention. This discussion should not be construed, however, as limiting the invention to those particular embodiments; practitioners skilled in the art will recognize numerous other embodiments as well. For definition of the complete scope of the invention, the reader is directed to appended claims.

Referring to FIG. 1, shown is an illustrative view of the present invention in use. The apparatus 10 is comprised of a housing 12 having a base 18 and pivot point 14 wherein the staples contained in magazine 16 are moved by a tensioning member into the guide housing assembly 34 fastened to housing 12 by stapler guide housing retaining fastener 36. Pressure placed upon handle 80 causes the housing to pivot upon pivot point 14 driving user selectable staple 22 through the material being bound 21 until the user selectable staple 22 encounters the staple housing diverter 20 thereby binding the selected material 21.

The stapling apparatus 10 has a guide housing 34 that includes guide rod 68, punch 64, die 56, and guide 48. With the exception of the guide rod 68, each of the aforementioned has a shape that is designed to accommodate the user selectable staple 22.

For illustrative purposes three different staples 22 are shown with their accompanying components that are uniquely designed to accommodate the user selectable staple 22. The user selectable staple 22A has a guide 48A for receiving the next available staple from magazine 16. Positioned above guide 48A is die 56A having a throughbore 58 conforming to the user selectable shaped staple 22A. Positioned within throughbore 58 is guide housing selectable shaped punch 64A having a punch exterior surface 66 that conforms and substantially engages die interior wall 60. Once pressure is applied to guide rod 68 punch 64A advances along throughbore 58 of die 56A engaging top surface 24 of staple 22A causing the staple to pass into a throughbore in guide 48A and into the material 21 to be bound.

The user selectable staple 22B has a guide 48B for receiving the next available staple from magazine 16. Positioned above guide 48B is die 56B having a throughbore 58 conforming to the user selectable shaped staple 22B. Positioned within throughbore 58 is guide housing selectable shaped punch 64B having a punch exterior surface 66 that conforms and substantially engages die interior wall 60. Once pressure is applied to guide rod 68 punch 64B advances along throughbore 58 of die 56B engaging top surface 24 of staple 22B causing the staple to pass into the guide throughbore 50 and into the material 21 to be bound whereupon staple legs 28 having lancing element 30 including prong 32 pierces material 21 until engaging the stapler diverter element 20 whereupon material 21 is clamped between top surface 24 of user selectable staple 22B and staple legs 28 of user selectable staple 22B.

Also shown is user selectable staple 22C having a guide 48C for receiving the next available stapler from magazine 16. Positioned above guide 48C is die 56C having a throughbore 58 conforming to the top surface 24 of user selectable shaped staple 22C and having positioned therein selectable shaped punch 64C having a punch exterior surface 66 that conforms and substantially engages die interior wall 60 of die 56C. Once pressure is applied to guide rod 68 punch 64C advances along throughbore 58 of die 56C engaging top surface 24 of staple 22C causing the staple to pass into the guide throughbore whereupon with continued pressure staple 22C will pierce one or more sheets of material 21 causing said material 21 to be clamped between top surface 24 of staple 22C and legs 28 of staple 22C.

Referring to FIG. 2, shown is a block diagram of the guide housing assembly 34 having a user selectable staple 22 therein. The guide housing assembly 34 has a handle 80 for applying pressure to the assembly to drive the user selectable staple 22 having a lancing element into the material to be bound. The handle 80 is connected to the punch 64 by means of punch rod 68. The punch 64 has a predetermined shape conforming to the top surface of the selectable shaped staple 22. Each punch 64 has a mating die 56 having a throughbore 58 and walls 60 which substantially conform and engage wall 66 of punch 64. Positioned below die 56 is guide 48 that is used to receive the next available staple 22 from the stapler magazine. Once pressure is applied to handle 80 punch 64 passes through die 56 and engages the top surface of staple 22 positioned within guide 48. Continued pressure causes punch 64 to move staple 22 through guide 48 until the staple legs engage the stapler diverter member which channels the legs under the staple top surface binding the material therebetween.

Referring to FIG. 3, shown is a perspective view of the present invention. The stapling apparatus 10 is comprised of a housing 12 having a base 18 and pivot point 14 and a staple magazine 16 for delivering a stick of user selectable shaped staples to the guide housing assembly. The guide housing assembly 34 is releasably fastened to the stapler housing 12 by means of fastener 36 whereby guide housing assembly 34 can be selectively removed for attachment of an alternate guide housing assembly providing means for using an alternate user selectable shaped staple 22.

In addition to replacing guide housing assembly 34 by removal of the stapler guide housing retaining fastener 36, specific components within the guide housing assembly 34 manufactured having a specific shape conforming to the top surface of the user selectable shaped staple 22 can be replaced by alternate components specifically manufactured for an alternate user selectable shaped staple 22.

Referring to FIG. 4, shown is an exploded view of the present invention for a user selectable shaped staple. The stapling apparatus 10 is comprised of a housing 12 having a base 18 and pivot point 14 having a stapler guide housing retaining fastener 36 for releasably fastening guide housing assembly 34 to said stapler housing. The guide housing 34 includes handle 80, guide housing drive return spring 78, plate 76, guide rod 68, punch 64, die 56, guide 48 and guide housing 35. Punch 64, die 56, and guide 48 are manufactured with a specific shape for use with a specific user selectable shaped staple.

The user selectable staple 22B has a guide 48B for receiving the next available staple from the staple magazine. Positioned above guide 48B is die 56B having a throughbore 58 conforming to the user selectable shaped staple 22B. Positioned within throughbore 58 is guide housing selectable shaped punch 64B having a punch exterior surface 66 that conforms and substantially engages die interior wall 60. Once pressure is applied to guide rod 68 punch 64B advances along throughbore 58 of die 56B engaging top surface 24 of staple 22B causing the staple to pass into the guide throughbore 50 and into the material selected for stapling. Staple legs 28 having lancing element 30 including prong 32 pierces the selected material until engaging the stapler diverter element 20 whereupon the selected material is clamped between top surface 24 of user selectable staple 22B and staple legs 28 of user selectable staple 22B.

As previously stated, in addition to replacing guide housing assembly 34 by removal of the stapler guide housing retaining fastener 36 from stapler housing fastener aperture 15 and guide housing fastener throughbore 37, the specific components guide housing punch 64, guide housing die 56 and guide housing guide 48 within the guide housing assembly 34 can be replaced with alternate components manufactured for an alternate user selectable shaped staple 22.

This provides a method whereby the guide housing punch 64, guide housing die 56, and guide housing guide 48 can be sold as a kit which may include the alternate user selectable shaped staple designed for said components.

Referring to FIG. 5, shown is a perspective view of the present invention. The stapling apparatus 10 has a housing 12 with staple magazine 16 contained therein having a tensioning member for moving user selectable shaped staple 22b into guide housing assembly 34 fastened to housing 12 by stapler guide housing retaining fastener 36.

Referring to FIG. 6, shown is a partial sectional view of the present invention. The stapling apparatus 10 has a housing 12 with staple magazine 16 for moving user selectable shaped staple 22 into guide housing guide 48. The guide housing 34 is comprised of handle 80 and plate 76 with guide housing drive return spring 78 positioned therebetween. Guide rod 68 connects handle 80 to punch 64 that travels in the throughbore of die 56 engaging user selectable staple 22 positioned within guide 48.

Referring to FIG. 7, shown is a partial sectional view of the present invention having pressure applied to handle 80 cause the punch 64 to engage user selectable shaped staple 22 moving said staple into the throughbore 50 of guide housing guide 48.

Referring to FIG. 8, shown is a partial sectional view of the present invention. The stapling apparatus 10 has a housing 12 with staple magazine 16 for moving user selectable shaped staple 22 into guide housing guide 48. The guide housing 34 is comprised of handle 80 and plate 76 with guide housing drive return spring 78 positioned therebetween. Guide rod 68 connects handle 80 to punch 64 that travels in the throughbore of die 56 engaging user selectable staple 22 positioned within guide 48 to travel into throughbore 50 of guide 48 before lancing the material to be stapled whereupon staple legs 28 are channeled by stapler housing diverter 20 causing the material to be clamped between top surface 24 and staple legs 28 of user selectable shaped staple 22.

Referring to FIG. 9, shown is the user selectable shaped stapler of the present invention 22 shown illustrated in alternate embodiments 22B, 22D and 22E. Each has a top surface 24 and stapler image 26, with user selectable shaped staple 22E having indicia thereon. User selectable shaped staple 22 has a pair of legs 28 positioned at each end of top surface 24 and extending perpendicularly therefrom. The legs 28 having lancing elements 30 terminating in prongs 32 for piercing a predetermined material selected for stapling using the user selectable shaped staple 22.

Referring to FIG. 9, shown is the user selectable shaped stapler of the present invention 22 shown illustrated in alternate embodiments 22B, 22D and 22E. Each has a top surface 24 and stapler image 26. With user selectable shaped staple 22E having indicia thereon. User selectable shaped staple 22 has a pair of legs 28 positioned at each distal end of top surface 24 and extending perpendicularly therefrom. The legs 28 having lancing elements 30 terminating in prongs 32 for piercing a predetermined material selected for stapling using the user selectable shaped staple 22.

What is claimed is new and desired to be protected by Letters Patent is set forth in the amended claims:

1. A method for securing items together with user selectable shaped staples comprising the steps of:
   a) inserting a plurality of user selectable shaped staples into a magazine section of a stapler wherein each of said plurality of user selectable shaped staples has a central section having a predetermined shape;
   b) advancing one of said plurality of user selectable shaped staples into a guide housing of said stapler having a shape substantially similar to the shape of said plurality of user selectable shaped staples;
   c) positioning items to be secured together between said magazine section and a base of said stapler at a position aligned with said guide housing;

d) applying a force on a side of said magazine section towards a base of said stapler;

e) causing a punch having a shape substantially similar to the shape of said plurality of user selectable shaped staples to contact said one of said user selectable shaped staples received within said guide housing to be released from said guide housing and out of said magazine section;

f) puncturing the items to be secured together by end sections of said user selectable shaped staple released from said guide housing thereby securing the items together.

2. The method as claimed in claim 1, further comprising the step of advancing a user selectable shaped staple of said plurality of user selectable shaped staples adjacent to said user selectable shaped staple released from said guide housing into said guide housing.

3. A method for securing items together with a user selectable decorative staple comprising the steps of:

a) inserting a plurality of user selectable decorative staples into a magazine section of a stapler wherein each of said plurality of user selectable decorative staples has a central section having a width and identifying indicia located thereon;

b) advancing one of said plurality of user selectable decorative staples into a guide housing of said stapler having a shape substantially similar to the shape of said plurality of user selectable decorative staples;

c) positioning items to be secured together between said magazine section and a base of said stapler at a position aligned with said guide housing;

d) applying a force on a side of said magazine section towards a base of said stapler;

e) causing a punch having a shape substantially similar to the shape of said plurality of user selectable decorative staples to contact said user selectable decorative staple received within said guide housing to be released from said guide housing and out of said magazine section; and f) puncturing the items to be secured together by end sections of said user selectable decorative staple released from said guide housing thereby securing the items together.

4. The method as claimed in claim 3, further comprising the step of advancing a user selectable decorative staple of said plurality of user selectable decorative staples adjacent to said user selectable decorative staple released from said guide housing into said guide housing.

5. A method for securing items together with user selectable shaped staples comprising the steps of:

a) inserting a plurality of user selectable shaped staples into a magazine section of a stapler wherein each of said plurality of user selectable shaped staples has a central section having a predetermined shape;

b) advancing one of said plurality of user selectable shaped staples into a guide of said stapler having a shape substantially similar to the shape of said plurality of user selectable shaped staples;

c) positioning items to be secured together between said magazine section and a base of said stapler at a position aligned with said guide;

d) applying a force on a side of said magazine section towards a base of said stapler;

e) causing a punch having a shape substantially similar to the shape of said plurality of user selectable shaped staples to pass through a die positioned between said punch and said guide and contact said one of said user selectable shaped staples received within said guide to be released from said guide and out of said magazine section;

f) puncturing the items to be secured together by end sections of said user selectable shaped staple released from said guide thereby securing the items together.

* * * * *